(12) United States Patent
Schleif (10) Patent No.: US 11,753,999 B2
(45) Date of Patent: Sep. 12, 2023

(54) GAS TURBINE SENSOR ASSEMBLY AND ASSOCIATED SHUTTER MECHANISM

(71) Applicant: General Electric Company, Schenectady, NY (US)

(72) Inventor: Kurt K. Schleif, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 289 days.

(21) Appl. No.: 17/350,202

(22) Filed: Jun. 17, 2021

(65) Prior Publication Data

US 2022/0403787 A1 Dec. 22, 2022

(51) Int. Cl.
*F02C 7/32* (2006.01)
*B08B 17/02* (2006.01)
*G01J 1/04* (2006.01)

(52) U.S. Cl.
CPC ............... *F02C 7/32* (2013.01); *B08B 17/02* (2013.01); *G01J 1/044* (2013.01); *F05D 2220/32* (2013.01); *F05D 2270/80* (2013.01)

(58) Field of Classification Search
CPC .. F02C 7/32; B08B 17/02; G01J 1/044; F05D 2220/32; F05D 2270/80; F05D 2270/804;
(Continued)

(56) References Cited

U.S. PATENT DOCUMENTS 4,240,691 A * 12/1980 Holmqvist ............... G02B 7/00
134/199
4,658,113 A 4/1987 Vingerling
(Continued)

FOREIGN PATENT DOCUMENTS

CN 2812047 Y 8/2006
CN 103149782 A 6/2013
(Continued)

OTHER PUBLICATIONS

European Search Report for EP Patent Application 22177507.5, dated Nov. 15, 2022, 5 pages.
(Continued)

*Primary Examiner* — Freddie Kirkland, III
(74) *Attorney, Agent, or Firm* — Armstrong Teasdale LLP (57) ABSTRACT

A turbine engine including a stationary component having a probe opening, a plurality of rotor blades rotatable relative to the stationary component, and a sensor assembly disposed within the probe opening. The sensor assembly includes a sensor and a shutter mechanism having a shutter frame with a sensing window and at least one leaf member coupled to the shutter frame. The sensor assembly includes an actuator including a rotatable member having a receiving slot and a stator having a stopper member within the receiving slot. The rotatable member rotates relative to the stator over a range of motion defined relative to the stopper member, and the rotatable member is coupled to the at least one leaf member such that rotating the rotatable member in a first direction uncovers the sensing window, and such that counter-rotating the rotatable member in a second direction covers the sensing window with the at least one leaf member. Selectively covering the sensor when not in use protects the sensor from exposure to harsh conditions, extending its operative life.

20 Claims, 6 Drawing Sheets

(58) Field of Classification Search
CPC ....... F05D 2270/8041; F05D 2270/821; F01D 17/02; F01D 17/08; F01D 17/085; F01D 21/003
See application file for complete search history.

(56) References Cited

U.S. PATENT DOCUMENTS

| | | | |
|---|---|---|---|
| 7,753,602 B2 | 7/2010 | Uehara | |
| 9,075,294 B2 | 7/2015 | Watanabe | |
| 9,482,596 B2 * | 11/2016 | Karp | G01M 15/14 |
| 10,307,800 B1 | 6/2019 | Lombrozo | |
| 10,676,070 B2 | 6/2020 | Giraud et al. | |
| 10,739,581 B2 * | 8/2020 | Lyyra | H04N 23/55 |
| 10,821,941 B2 | 11/2020 | Numakunai | |
| 2002/0079431 A1 | 6/2002 | Kuhns et al. | |
| 2004/0252179 A1 | 12/2004 | Kraicer et al. | |
| 2017/0045384 A1 | 2/2017 | Harpin et al. | |
| 2017/0131122 A1 | 5/2017 | Harpin et al. | |
| 2017/0219424 A1 | 8/2017 | Myers et al. | |
| 2020/0156201 A1 | 5/2020 | Martelli et al. | |
| 2020/0223401 A1 | 7/2020 | Little | |

FOREIGN PATENT DOCUMENTS

| | | |
|---|---|---|
| CN | 103885274 A | 6/2014 |
| CN | 104569305 A | 4/2015 |
| CN | 103135325 B | 7/2015 |
| CN | 104267563 B | 10/2016 |
| CN | 106483745 A | 3/2017 |
| CN | 104044558 B | 3/2018 |
| CN | 105824174 B | 4/2018 |
| CN | 210922672 U | 7/2020 |
| DE | 1497581 A1 | 4/1969 |
| DE | 102019101092 A1 | 7/2020 |
| EP | 3385132 B1 | 2/2020 |
| JP | 11064971 A | 3/1999 |
| JP | 2010145652 A | 7/2010 |
| JP | 04939141 B2 | 5/2012 |
| JP | 2013210415 A | 10/2013 |
| JP | 5830884 B2 | 12/2015 |
| JP | 05896729 B2 | 3/2016 |
| RU | 2720186 C1 | 4/2020 |
| RU | 2727635 C1 | 7/2020 |

OTHER PUBLICATIONS

Chavez et al. "A Device for Protecting Moored Spectroradiometers from Biofouling." Journal of Atmospheric and Oceanic Technology, 2000.

Manov et al. "Methods for Reducing Biofouling of Moored Optical Sensors." Journal of Atmospheric and Oceanic Technology, 2003.

* cited by examiner

GAS TURBINE SENSOR ASSEMBLY AND ASSOCIATED SHUTTER MECHANISM

BACKGROUND

The present disclosure relates generally to sensors for use in turbine engines and, more specifically, to a shutter mechanism for use in shielding sensors from operating conditions within gas turbine engines.

At least some known turbine engines include a compressor, a combustor, and a turbine coupled together in a serial flow relationship. Compressed air is discharged from the compressor, mixed with fuel, and ignited in the combustor to form a high energy gas stream. The high energy gas stream flows through the turbine, creating a high temperature environment within and downstream from the combustor and turbine, which is commonly referred to as the "hot gas path."

In at least some known turbines, operating and environmental conditions are monitored with probes, such as non-contact type sensors based on optics, capacitance, inductance, reluctance, magnetism, and the like. To accurately measure the conditions of the environment, many known probes are positioned in exposure to the hot gas path of the turbine engine. Contaminants in the hot gas path, such as water, soot, sand, smoke, unburnt fuel, and/or other foreign debris can degrade signal quality and reduce the accuracy of any measurements to be taken. In addition, exposure to the hot gas path can induce thermal and/or mechanical stresses and strains into the probes that can damage the probe and/or reduce its useful service life. Such damage can result in costly replacement of the probe and/or increased downtime of the turbine engine. For example, if a probe must be replaced, recalibration of a replacement probe may be a time-consuming and/or difficult task.

BRIEF DESCRIPTION

In one aspect, a turbine engine is provided. The turbine engine includes a stationary component having a probe opening, a plurality of rotor blades, each of which is rotatable relative to the stationary component, and a sensor assembly within the probe opening. The sensor assembly includes a sensor and a shutter mechanism that includes a shutter frame having a sensing window. The sensor is configured to measure a target of interest within the turbine engine through the sensing window. At least one leaf member is disposed within the shutter frame and configured to selectively cover and uncover the sensing window. The sensor assembly also includes an actuator including a rotatable member having a receiving slot, and a stator having a stopper member disposed within the receiving slot. The rotatable member is rotatable relative to the stator over a range of motion defined relative to the stopper member, and the rotatable member is coupled to the at least one leaf member such that rotating the rotatable member in a first direction uncovers the sensing window, and such that counter-rotating the rotatable member in a second direction covers the sensing window with the at least one leaf member.

In another aspect, a shutter mechanism for use in shielding a sensor is provided. The shutter mechanism includes a shutter frame having a sensing window. At least one leaf member is disposed within the shutter frame and configured to selectively cover and uncover the sensing window. The sensor assembly also includes an actuator including a rotatable member having a receiving slot, and a stator having a stopper member disposed within the receiving slot. The rotatable member is rotatable relative to the stator over a range of motion defined relative to the stopper member, and the rotatable member is coupled to the at least one leaf member such that rotating the rotatable member in a first direction uncovers the sensing window, and such that counter-rotating the rotatable member in a second direction covers the sensing window with the at least one leaf member.

In yet another aspect, a sensor assembly having a sensor and a shutter frame having a sensing window. At least one leaf member is configured to selectively cover and uncover the sensing window. The sensor assembly also includes an actuator including a rotatable member having a receiving slot, and a stator having a stopper member disposed within the receiving slot. The rotatable member is rotatable relative to the stator over a range of motion defined relative to the stopper member, and the rotatable member is coupled to the at least one leaf member such that rotating the rotatable member in a first direction uncovers the sensing window, and such that counter-rotating the rotatable member in a second direction covers the sensing window with the at least one leaf member.

DETAILED DESCRIPTION

The embodiments described herein relate to a shutter mechanism that may be used to selectively shield sensors from operating conditions within gas turbine engines. The shutter mechanism is capable of selectively opening and closing to shield an optical sensor, for example, from exposure to foulants within a gas turbine engine. Optical and other sensor technologies require a clean path to the target of interest to be monitored by the sensor to facilitate obtaining accurate, meaningful, and useful data. Accordingly, the shutter mechanism may be closed when operating conditions within the gas turbine engine may degrade the optical sensor and/or its signal quality, or during periods when the sensor is not in use. When the operating conditions within the gas turbine engine are favorable and/or measurements are required to be taken, the shutter mechanism may be opened as-needed and for a limited duration to expose the optical sensor to the environment. The shutter mechanism facilitates shielding sensitive optical components of the sensor from fogging, overheating, fouling, or otherwise sustaining damage due to environmental conditions. Accordingly, the service life of the optical sensor assembly is increased, and calibration of the optical sensor is maintained.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
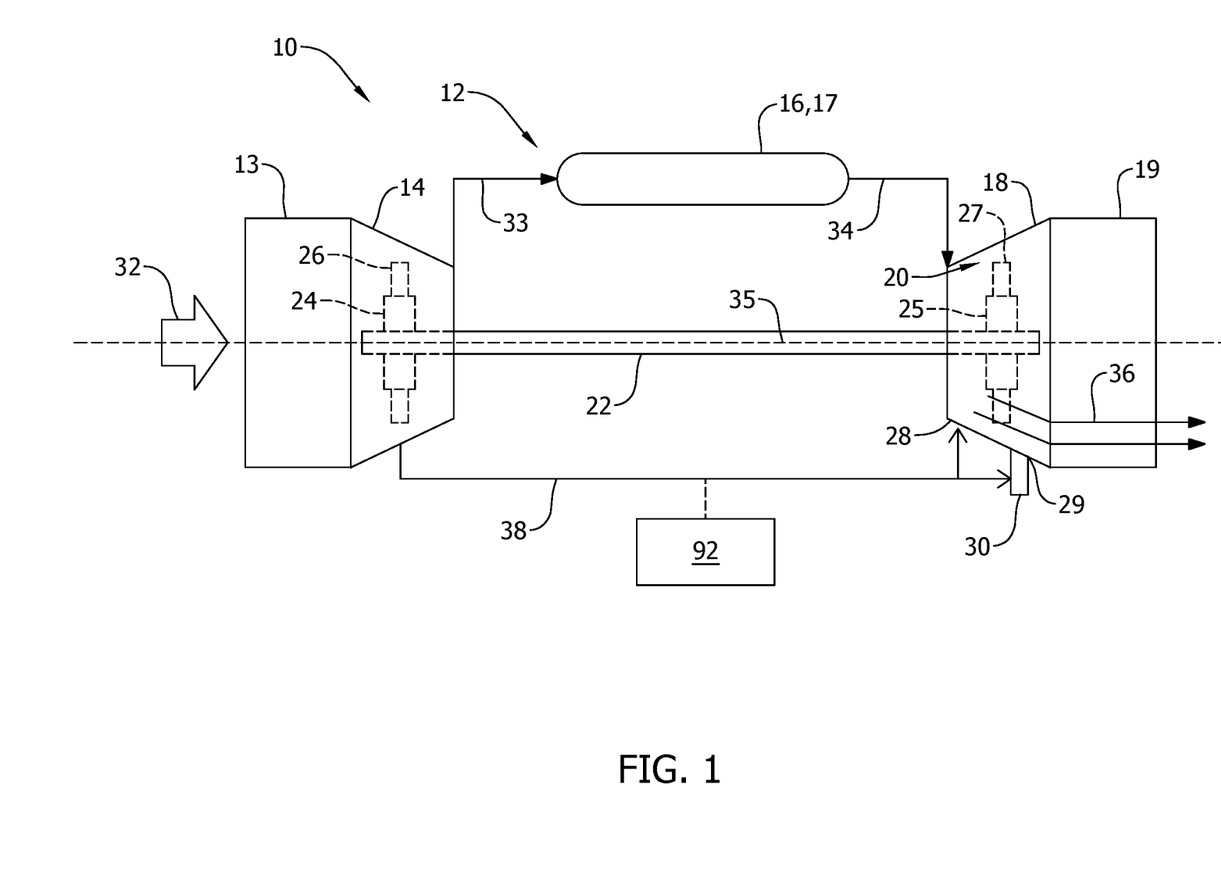
FIG. 1 is a schematic illustration of an exemplary turbine engine assembly.

FIG. 1 is a schematic illustration of an exemplary turbine engine assembly 10. In the exemplary embodiment, turbine engine assembly 10 includes a gas turbine engine 12 that includes an inlet section 13, a compressor section 14 disposed downstream from the inlet section 13, a combustor section 16 (having a plurality of combustors 17) positioned downstream from compressor section 14, a turbine section 18 positioned downstream from combustor section 16, and an exhaust section 19 disposed downstream from the turbine section 18. Additionally, the gas turbine engine 12 may include one or more shafts 22 coupled between the compressor section 14 and the turbine section 18.

The compressor section 14 may generally include a plurality of rotor disks 24 (one of which is shown) and a plurality of rotor blades 26 extending radially outward from and connected to each rotor disk 24. Each rotor disk 24 in turn may be coupled to or form a portion of the shaft 22 that extends through the compressor section 14. The compressor section 14 includes a plurality of compressor stages, each of which includes a circumferential array of rotor blades 26 and a corresponding circumferential array of stator blades (not shown) that are mounted to the casing of the compressor section 14. The stator blades direct the incoming air into the rotor blades 26, such that the air is progressively compressed through the compressor section 14.

Turbine section 18 includes a plurality of rotor disks 25 (one of which is shown) and a plurality of rotor blades 27 extending radially outward from and being interconnected to each rotor disk 25. Each rotor disk 25 in turn may be coupled to or form a portion of the shaft 22 that extends through the turbine section 18. The turbine section 18 further includes a stationary component 28 such as, but not limited to, a heat shield, a shroud, or a casing that surrounds the rotor blades 27 and that at least partially defines a hot gas path 20 through the turbine section 18. The stationary component 28 further includes a plurality of stator blades (not shown), which are arranged in one or more stages with the rotor blades 27 to expand a flow of combustion gas 34.

Stationary component 28 also has a probe opening 29 defined therein. As will be described in more detail below, a sensor assembly 30 is within the probe opening 29 for monitoring the hot gas path 20.

In operation, a flow of intake air 32 is channeled through the inlet section 13 and the compressor section 14, and a flow of compressed air 33 is channeled towards combustor section 16, where the air is mixed with fuel and combusted to form a flow of combustion gas 34 that is discharged towards turbine section 18. The flow of combustion gas 34 discharged from combustor section 16 drives turbine section 18 about a centerline 35 of gas turbine engine 12, and the flow of combustion gas 34 is channeled through turbine section 18 and then discharged from gas turbine engine 12, via the exhaust section 19, in the form of a flow of exhaust gas 36.

Further, in some embodiments, compressor section 14 channels pressurization fluid 38 (e.g., bleed air) towards turbine section 18 and/or sensor assembly 30. The bleed air 38 is channeled towards turbine section 18 to, for example, provide thermal management for the outer casing and hot gas path components therein. Additionally, the bleed air 38 can be used to actuate sensor assembly 30, as will be described in more detail below. In an alternative embodiment, sensor assembly 30 may be provided with pressurized fluid from an external source.

FIGS. 2-6 illustrate various views of an exemplary sensor assembly 30 that may be used with turbine engine assembly 10 (shown in FIG. 1). In the exemplary embodiment, sensor assembly 30 includes a sensor 40 and a shutter mechanism 42. Shutter mechanism 42 includes a shutter frame 44 having a sensing window 46, and a plurality of leaf members 48 coupled thereto. Sensor 40 is positioned within shutter mechanism 42 and is oriented to measure a target of interest within turbine engine assembly 10 through sensing window 46. The target of interest may be, for example, the clearance between rotating and stationary parts of assembly 10 (e.g., between rotor blade 27 and stationary component 28 (e.g., the casing)), the time-of-arrival of the rotating part (e.g., rotor blade 27), the temperature of the part, and/or characteristics (e.g., temperature, pressure, and emissions) of gas flowing that flows through the hot gas path 20 (shown in FIG. 1) itself. Sensor 40 may be any non-contact type sensor, such as an optical sensor or a capacitance probe. Example optical sensors can include, but are not limited to, blade tip timing laser probes, blade tip clearance laser probes, pyrometers, interferometers, and infrared cameras.

Figure 3:
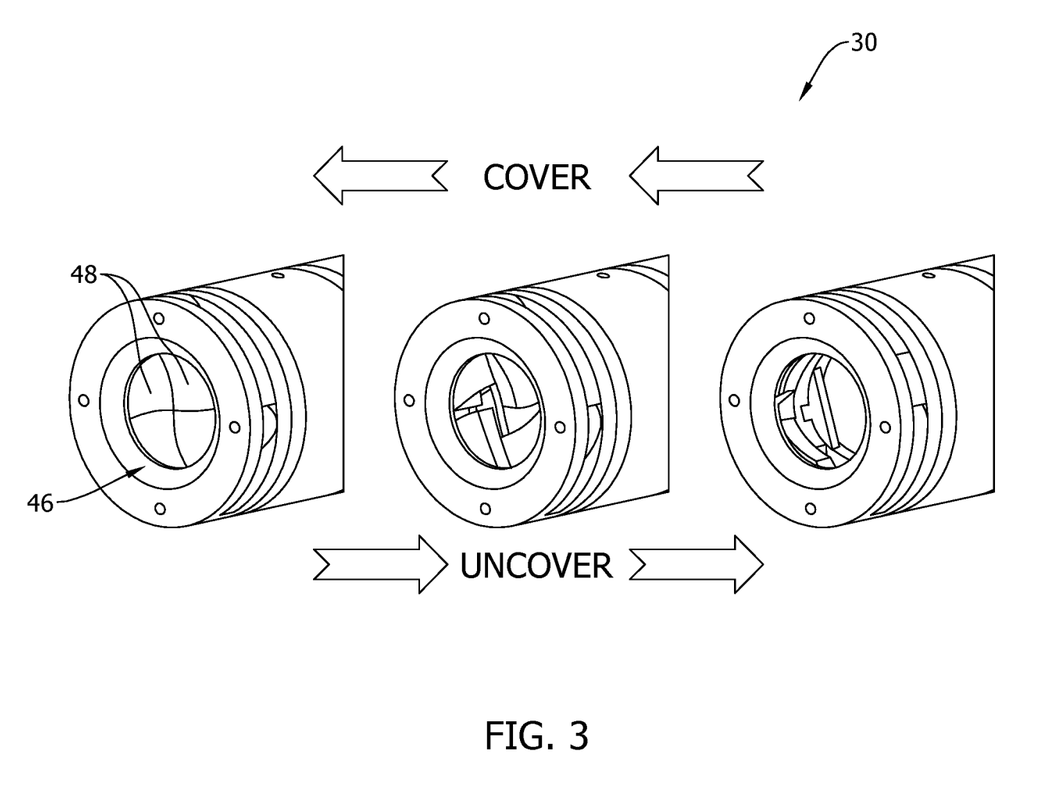
FIG. 3 is a progression view illustrating the opening and closing of the sensor assembly shown in FIG. 2.

As shown in FIG. 3, leaf members 48 are rotatable relative to shutter frame 44 to selectively cover and uncover sensing window 46. Accordingly, leaf members 48 are selectively positionable to uncover sensing window 46 to enable sensor 40 to take measurements and are selectively (re)positionable to cover sensing window 46 to shield sensor 40 from fouling and/or exposure to contaminants entrained in hot gas path 20. In the exemplary embodiment, leaf members 48 are shaped to enable members 48 to "nest" (engage) with each other when in the covered position to facilitate substantially sealing sensing window 46 to inhibit the passage of foulants and/or contaminants therethrough. Leaf members 48 may or may not overlap one another.

Although illustrated as only including four leaf members 48, it should be understood that shutter mechanism 42 may have any other number of leaf members 48 and that members 48 may be in any nestable configuration that enables sensor assembly 30 to function as described herein. For example, sensing window 46 may be selectively covered and uncovered by a single disc that rotates in/out of a desired position, by a plurality of discrete louvers that rotate open/closed, by flaps that selectively flip up and down, by a membrane or thin-walled member that is selectively movable under a force such as air pressure, by two or more leaves that selectively hinge open/closed like scissors, and/or by any combination of these mechanisms, or any other device that enables sensor 40 to function as described herein.

Leaf members 48 may be actuated between the covered and uncovered positions using any technology that enables shutter mechanism 42 to function as described herein. For example, leaf members 48 may be actuated via pneumatics, a piezoelectric device, a magnetic device, a hydraulic device, a mechanical linkage, a screw actuator, and/or a cable system. In the exemplary embodiment, leaf members 48 are actuated via pressurization fluid 38 received from compressor section 14 (both shown in FIG. 1), as will be described in more detail below.

Figure 2:
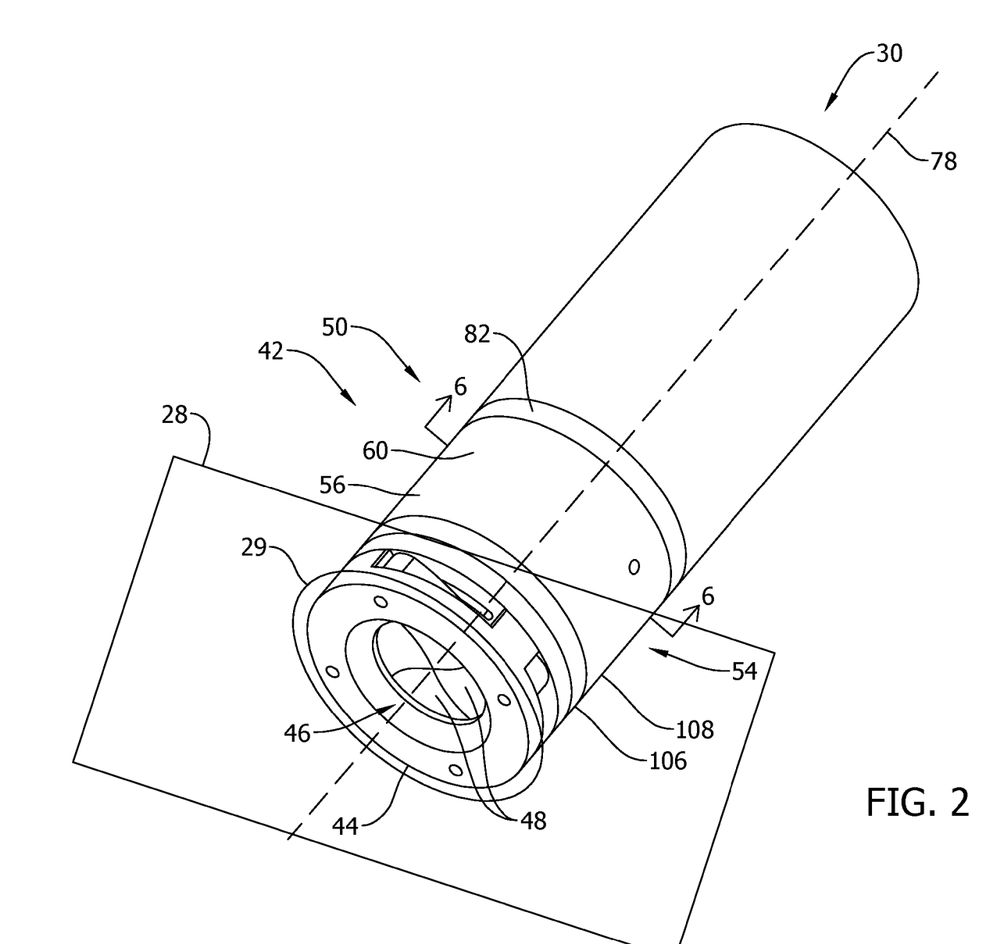
FIG. 2 is a perspective view of an exemplary sensor assembly that may be used with the turbine engine assembly shown in FIG. 1.
Figure 4:
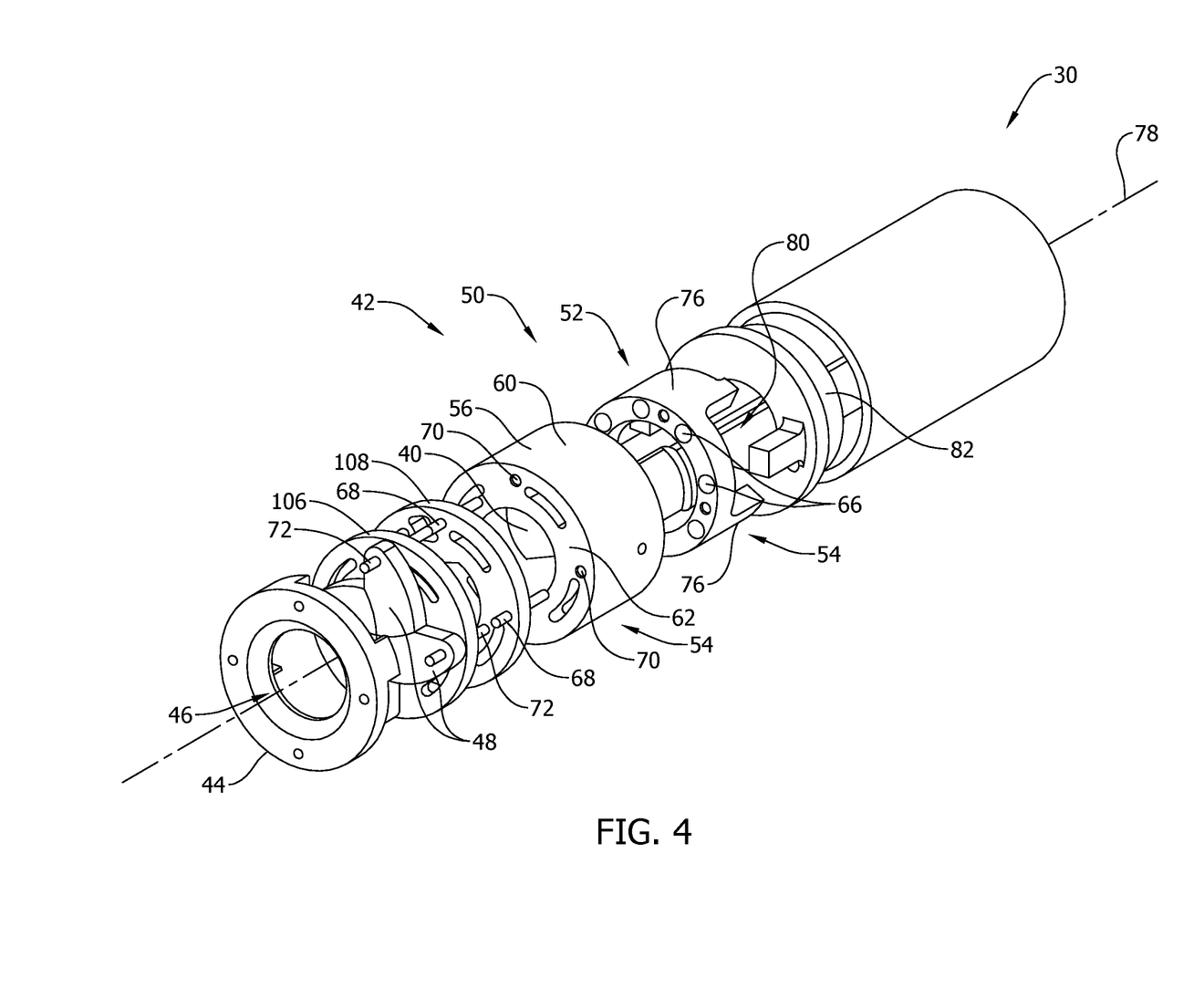
FIG. 4 is an exploded view of the sensor assembly shown in FIG. 2.
Figure 5:
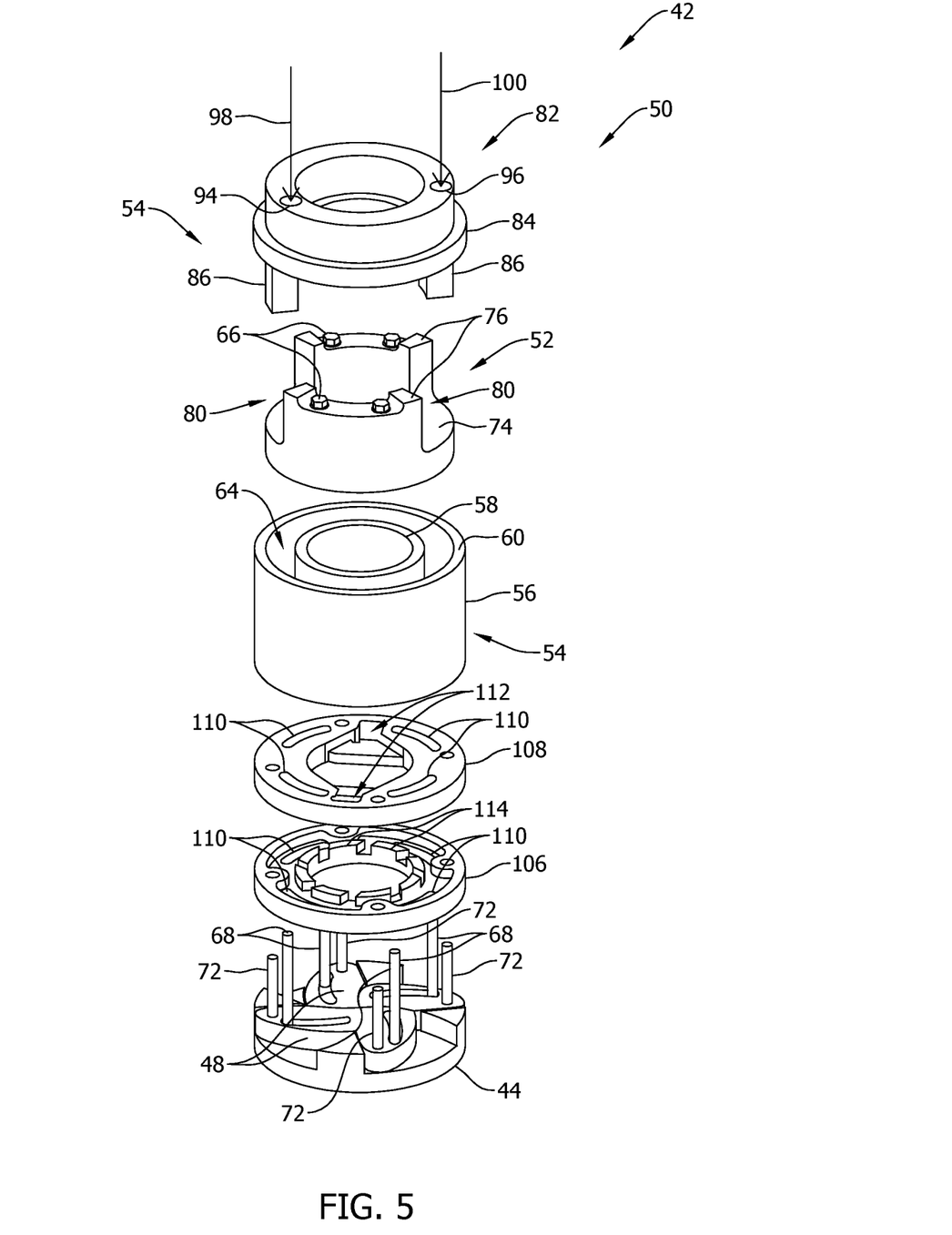
FIG. 5 is an exploded view of a portion of the sensor assembly shown in FIG. 3.
Figure 6:
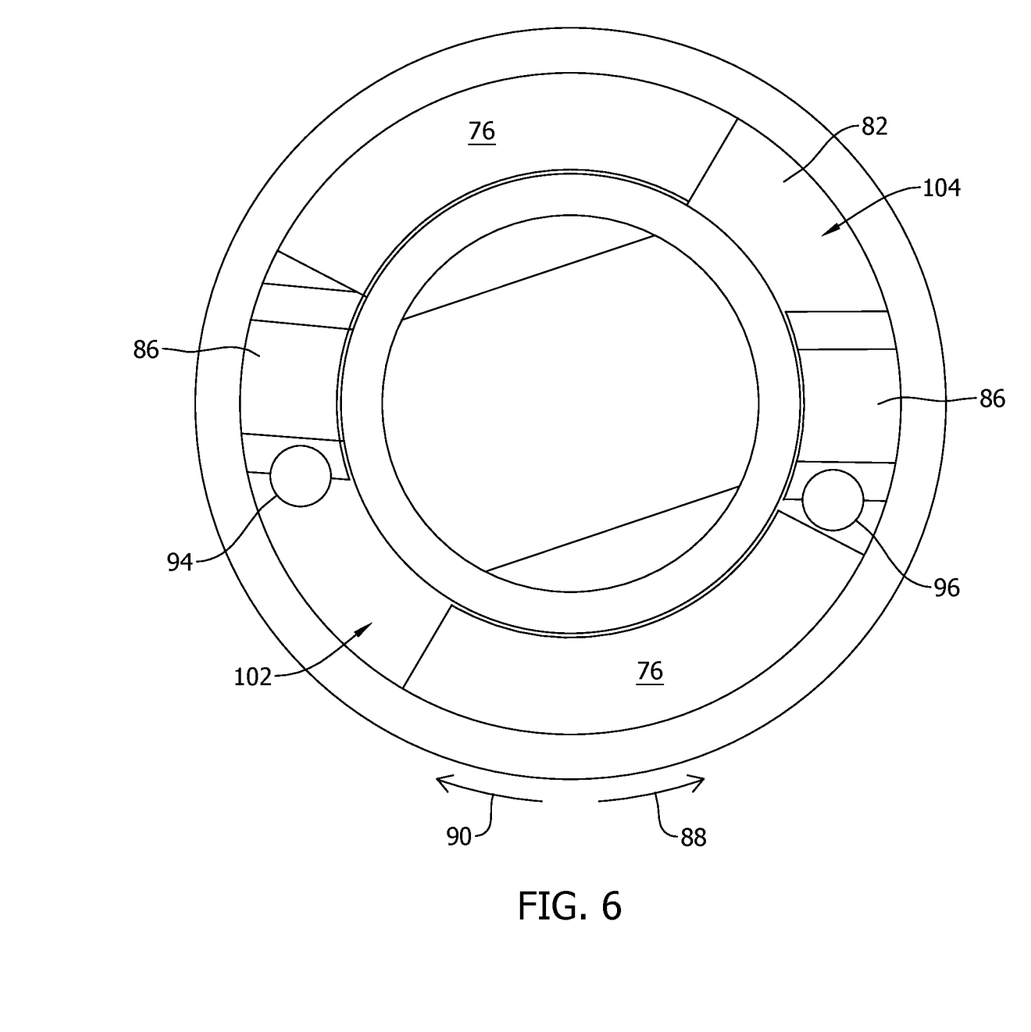
FIG. 6 is a cross-sectional view of the sensor assembly, taken along line 6-6 shown in FIG. 2.

Referring again to FIGS. 2-6, shutter mechanism 42 includes an actuator 50 that is coupled to leaf members 48 for moving leaf members 48 between the covered and uncovered positions. Referring to FIGS. 2, 4, and 5, actuator 50 includes a rotatable member 52 and a stator 54. Stator 54 includes an actuator housing 56 defined by a radial inner wall 58, a radial outer wall 60, and a front wall 62, which together define an interior channel 64. Rotatable member 52 is positionable within interior channel 64 with a clearance fit, for example. Thus, rotatable member 52 is movable within interior channel 64. In one embodiment, movement of rotatable member 52 within interior channel 64 may be facilitated by ball bearings 66 that are between rotatable member 52 and stator 54.

In the exemplary embodiment, leaf members 48 are coupled to rotatable member 52 with connector pins 68. For example, front wall 62 has pin holes 70 defined therein, and connector pins 68 extend through pin holes 70 to physically connect leaf members 48 and rotatable member 52. In addition, each leaf member 48 is coupled to shutter frame 44 with connector pins 72, defining a respective pivot point therebetween. Thus, rotatable member 52 is movable within interior channel 64 to facilitate moving leaf members 48 between the covered and uncovered positions.

Rotatable member 52 includes a base frame 74 and a pair of arcuate side walls 76 extending from base frame 74. Arcuate side walls 76 are spaced from each other circumferentially relative to a centerline 78 of sensor assembly 30 such that a receiving slot 80 is defined therebetween. Referring to FIG. 5, when rotatable member 52 is positioned within interior channel 64 of stator 54, radial inner wall 58 is disposed within receiving slot 80, and radial outer wall 60 surrounds arcuate side walls 76.

Referring again to FIGS. 2, 4, and 5, stator 54 also includes a stopper insert 82 coupled to actuator housing 56 to enclose rotatable member 52 within interior channel 64. Stopper insert 82 includes a shoulder base 84 and a pair of stopper members 86 extending from shoulder base 84. Stopper members 86 are sized for insertion within receiving slot 80. Thus, stopper members 86 are adapted to impede the range of motion of rotatable member 52 rotating relative to stator 54. For example, when rotatable member 52 rotates in a first direction 88 (FIG. 6), one arcuate side wall 76 abuts against a first of the stopper members 86. When rotatable member 52 counter-rotates in a second direction 90, the other arcuate side wall 76 abuts against a second of the stopper members 86. Accordingly, the range of motion of rotatable member 52 is limited and defined relative to stopper members 86, and the range of motion is correspondingly defined for leaf members 48.

Actuation of shutter mechanism 42 may be performed manually by a technician, and/or automatically using pneumatics, a piezoelectric device, a magnetic device, a hydraulic device, a mechanical linkage, a screw actuator, and/or a cable system, as described above. Such operation may be controlled by a controller 92 (shown in FIG. 1), including a memory and a processor adapted to execute programmed commands. For example, controller 92 may control covering and uncovering of sensing window 46 based on at least one of a temperature or a pressure of the hot gas path, and/or an operating status of turbine engine 12 (shown in FIG. 1). For example, controller 92 may cover sensing window 46 when a temperature or pressure of hot gas path 20 (shown in FIG. 1) is greater than a predefined threshold, and/or when operating conditions of turbine engine 12 are known to be harsh (e.g., startup, water wash, and liquid fuel operation). In addition, controller 92 may open/close sensing window 46 based on a schedule (time-based) or based on feedback received from other sensors. For example, if a sensor 40 in the hot gas path 20 detected conditions typical of a flame-out condition in the combustion section 16, controller 92 could activate an idle sensor assembly 30 in the combustor (i.e., a sensor assembly with a closed shutter) to open the shutter mechanism 42 and expose the sensor 40.

In the exemplary embodiment, bleed air (that is, pressurization fluid 38) is channeled towards sensor assembly 30 for rotating rotatable member 52 in first and second directions 88 and 90. More specifically, referring to FIGS. 5 and 6, stopper insert 82 has a first port 94 and a second port 96 defined therein. A first pressurization line 98 is coupled to first port 94, and a second pressurization line 100 is coupled to second port 96. First and second pressurization lines 98 and 100 receive the bleed air directed toward turbine section 18 (shown in FIG. 1), and the bleed air is selectively channeled through first and second ports 94 and 94 to facilitate rotation of rotatable member 52.

For example, in one embodiment, first pressurization line 98 selectively (e.g., as determined by controller 92 (shown in FIG. 1)) channels a first flow of pressurization fluid 38 through first port 94 and into a first receiving slot 102 of actuator 50, and second pressurization line 100 selectively channels a second flow of pressurization fluid 38 through second port 96 and into a second receiving slot 104 of actuator 50. First and second receiving slots 102, 104 are circumferentially opposite one another. Channeling the first flow into first receiving slot 102 facilitates rotating rotatable member 52 in first direction 88 to open leaf members 48 and uncover sensing window 46. Channeling the second flow into second receiving slot 104 facilitates rotating rotatable member 52 in second direction 90 to close leaf members 48 and cover sensing window 46.

In one embodiment, only one of the first flow and the second flow are channeled into actuator 50 at a time to control the covering and uncovering of sensing window 46. Alternatively, second pressurization line 100 continuously channels a passive flow of pressurization fluid 38 towards rotatable member 52. The passive flow is channeled at a first pressure that is great enough to hold leaf members 48 in the covered position. When measurements need to be taken, the first flow is selectively channeled towards rotatable member 52 at a second pressure that is greater than the first pressure. Thus, the pressurization provided by the passive flow is overcome by the pressurization provided by the first flow, and leaf members 48 are held in the uncovered position. When the first flow is ceased, the passive flow enables the leaf members 48 to be automatically returned to the covered position ("fail close"). In an alternative embodiment, actuator 50 is configured to automatically return leaf members 48 to the uncovered position ("fail open").

Referring again to FIGS. 2, 4, and 5, sensor assembly 30 further includes a swirler plate 106 coupled to shutter frame 44, and a deflector plate 108 coupled to swirler plate 106. Swirler plate 106 and deflector plate 108 each include guide slots 110 defined therein that are sized to receive connector pins 68 therethrough and that define the range of motion of leaf members 48. In addition, deflector plate 108 has bypass openings 112 defined therein, and swirler plate 106 has swirler vanes 114 that are in flow communication with bypass openings 112. Bypass openings 112 are oriented to direct airflow in a generally radially outward direction relative to centerline 78, and swirler vanes 114 are oriented to redirect the airflow received from bypass openings 112 generally radially inward and across the rear face of leaf members 48. The bypass allows for continuous, uninterrupted cooling of the sensor 40 regardless of whether the shutter mechanism 42 is opened or closed. Without this feature, the flow of cooling air would stop when the shutter mechanism 42 closes, possibly causing the sensor 40 to overheat. Accordingly, the airflow acts as a cooling fluid for leaf members 48 that are exposed to hot gas path 20 (shown in FIG. 1).

The embodiments described herein relate to a shutter mechanism for use in shielding sensors from harsh conditions within gas turbine engines. The shutter mechanism facilitates shielding an associated sensor from fouling or other harmful conditions, which in turn increases the useful service life and accuracy of the sensor. For example, the shutter mechanism includes a plurality of leaf members that work in concert to cover and uncover a sensing window of the shutter mechanism in which the sensor monitors the hot gas path therethrough. The shutter mechanism facilitates shielding sensitive optical components of the sensor from fogging, overheating, fouling, or otherwise sustaining damage due to environmental conditions.

The above description is meant to be exemplary only, and one skilled in the art will recognize that changes may be made to the embodiments described without departing from the scope of the invention disclosed. Modifications, which fall within the scope of the present invention, will be apparent to those skilled in the art, in light of a review of this disclosure, and such modifications are intended to fall within the appended claims.

Exemplary embodiments of gas turbine engines and associated sensor assemblies are described above in detail. The systems and methods described herein are not limited to the specific embodiments described herein, but rather, steps of the methods may be utilized independently and separately from other steps described herein. For example, the methods described herein are not limited to practice with industrial gas turbine engines as described herein. Rather, the exemplary embodiment can be implemented and utilized in connection with any application that implements non-contact type sensors.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

While the invention has been described in terms of various specific embodiments, those skilled in the art will recognize that the invention can be practiced with modification within the spirit and scope of the claims.

Exemplary clauses that describe the present sensor assembly, shutter mechanism, and gas turbine engine are as follows:

According to a first aspect, a turbine engine comprises: a stationary component comprising a probe opening; a plurality of rotor blades, each of which is rotatable relative to the stationary component; and a sensor assembly within the probe opening, the sensor assembly comprising a sensor and a shutter mechanism that comprises: a shutter frame comprising a sensing window, the sensor configured to measure a target of interest within the turbine engine through the sensing window; at least one leaf member disposed within the shutter frame and configured to selectively cover and uncover the sensing window; and an actuator comprising: a rotatable member comprising a receiving slot; and a stator comprising a stopper member disposed within the receiving slot, wherein the rotatable member is rotatable relative to the stator over a range of motion defined relative to the stopper member, and wherein the rotatable member is coupled to the at least one leaf member such that rotating the rotatable member in a first direction uncovers the sensing window, and such that counter-rotating the rotatable member in a second direction covers the sensing window with the at least one leaf member.

According to a previous aspect, the turbine engine further comprises a controller communicatively coupled to the actuator for selectively rotating the rotatable member, the controller configured to control covering and uncovering of the sensing window based on at least one of a temperature or a pressure of the hot gas path, or an operating status of the turbine engine.

According to any one or more previous aspects, the turbine engine further comprises a compressor section in flow communication with the stationary component and the actuator, the compressor section configured to provide bleed air to the actuator for selectively rotating the rotatable member.

According to any one or more previous aspects, the turbine engine further comprises at least one of a piezoelectric device, a magnetic device, a hydraulic device, a mechanical linkage, a screw actuator, or a cable system coupled to the actuator for selectively rotating the rotatable member.

According to any one or more previous aspects, the stationary component comprises at least one of a heat shield, a shroud, or a casing of the turbine engine.

According to any one or more previous aspects, the sensor is one of an optical sensor or a capacitance probe.

According to a second aspect of the present disclosure, a shutter mechanism for use in shielding a sensor comprises: a shutter frame comprising a sensing window; at least one leaf member disposed within the shutter frame and configured to selectively cover and uncover the sensing window; and an actuator comprising: a rotatable member comprising a receiving slot; and a stator comprising a stopper member disposed within the receiving slot, wherein the rotatable member is rotatable relative to the stator over a range of motion defined relative to the stopper member, and wherein the rotatable member is coupled to the at least one leaf member such that rotating the rotatable member in a first direction uncovers the sensing window, and such that counter-rotating the rotatable member in a second direction covers the sensing window with the at least one leaf member.

According to the second aspect, the shutter mechanism further comprises a first pressurization line configured to channel a first flow of pressurization fluid towards the rotatable member, the first flow configured to rotate the rotatable member in the first direction.

According to one or more previous aspects, the shutter mechanism further comprises a second pressurization line configured to channel a second flow of pressurization fluid towards the rotatable member, the second flow configured to counter-rotate the rotatable member in the second direction.

According to one or more previous aspects, the shutter mechanism further comprises the second pressurization line, which is configured to channel a passive flow of pressurization fluid towards the rotatable member, wherein the passive flow is configured to rotate the rotatable member in the second direction, and the passive pressurization fluid is channeled at a lower pressure than the first flow such that the rotatable member rotates in the first direction when the first flow is channeled towards the rotatable member.

According to one or more previous aspects, the shutter mechanism further comprises at least one plate coupled to the shutter frame, the at least one plate configured to channel cooling fluid across the at least one leaf member.

According to one or more previous aspects of the shutter mechanism, the at least one plate has a guide slot defined therein, and the shutter mechanism further comprises: a connector coupled between the at least one leaf member and the rotatable member, wherein the connector is translatable within the at least one guide slot to define a range of motion of the at least one leaf member.

According to one or more previous aspects of the shutter mechanism, the at least one leaf member comprises a plurality of leaf members that are nestable with each other when at least one of covering or uncovering the sensing window.

According to one or more previous aspects of the shutter mechanism, the shutter mechanism comprises at least one of a piezoelectric device, a magnetic device, a hydraulic device, a mechanical linkage, a screw actuator, or a cable system coupled to the actuator for selectively rotating the rotatable member.

According to a third aspect, a sensor assembly comprises: a sensor; a shutter frame comprising a sensing window; at least one leaf member configured to selectively cover and uncover the sensing window; and an actuator comprising: a rotatable member comprising a receiving slot; and a stator comprising a stopper member disposed within the receiving slot, wherein the rotatable member is rotatable relative to the stator over a range of motion defined relative to the stopper member, and wherein the rotatable member is coupled to the at least one leaf member such that rotating the rotatable member in a first direction uncovers the sensing window, and such that counter-rotating the rotatable member in a second direction covers the sensing window with the at least one leaf member.

According to any one or more previous aspects, the sensor assembly further comprises a first pressurization line configured to channel a first flow of pressurization fluid towards the rotatable member, the first flow configured to rotate the rotatable member in the first direction.

According to any one or more previous aspects, the sensor assembly further comprises a second pressurization line configured to channel a second flow of pressurization fluid towards the rotatable member, the second flow configured to counter-rotate the rotatable member in the second direction.

According to any one or more previous aspects of the sensor assembly, the second pressurization line is configured to channel a passive flow of pressurization fluid towards the rotatable member, wherein the passive flow is configured to rotate the rotatable member in the second direction, and the passive pressurization fluid is channeled at a lower pressure than the first flow such that the rotatable member rotates in the first direction when the first flow is channeled towards the rotatable member.

According to any one or more previous aspects, the sensor assembly further comprises at least one of a piezoelectric device, a magnetic device, a hydraulic device, a mechanical linkage, a screw actuator, or a cable system coupled to the actuator for selectively rotating the rotatable member.

According to any one or more previous aspects of the sensor assembly, the sensor is one of an optical sensor or a capacitance probe.

What is claimed is:

1. A turbine engine comprising:
    a stationary component comprising a probe opening;
    a plurality of rotor blades, each of which is rotatable relative to the stationary component; and
    a sensor assembly within the probe opening, the sensor assembly comprising a sensor and a shutter mechanism that comprises:
        a shutter frame comprising a sensing window, the sensor configured to measure a target of interest within the turbine engine through the sensing window;
        at least one leaf member disposed within the shutter frame and configured to selectively cover and uncover the sensing window; and
        an actuator comprising:
            a rotatable member comprising a receiving slot; and
            a stator comprising a stopper member disposed within the receiving slot,
            wherein the rotatable member is rotatable relative to the stator over a range of motion defined relative to the stopper member, and
            wherein the rotatable member is coupled to the at least one leaf member such that rotating the rotatable member in a first direction uncovers the sensing window, and such that counter-rotating the rotatable member in a second direction covers the sensing window with the at least one leaf member.

2. The turbine engine in accordance with claim 1, further comprising a controller communicatively coupled to the actuator for selectively rotating the rotatable member, the controller configured to control covering and uncovering of the sensing window based on at least one of a temperature or a pressure of the hot gas path, or an operating status of the turbine engine.

3. The turbine engine in accordance with claim 1, further comprising a compressor section in flow communication with the stationary component and the actuator, the compressor section configured to provide bleed air to the actuator for selectively rotating the rotatable member.

4. The turbine engine in accordance with claim 1, wherein the stator further comprises an actuator housing comprising an interior channel, wherein the rotatable member is positionable within the interior channel with a clearance fit.

5. The turbine engine in accordance with claim 1, wherein the stationary component comprises at least one of a heat shield, a shroud, or a casing of the turbine engine.

6. The turbine engine in accordance with claim 1, wherein the sensor is one of an optical sensor or a capacitance probe.

7. A shutter mechanism for use in shielding a sensor, the shutter mechanism comprising:
    a shutter frame comprising a sensing window;
    at least one leaf member disposed within the shutter frame and configured to selectively cover and uncover the sensing window; and
    an actuator comprising:
        a rotatable member comprising a receiving slot; and
        a stator comprising a stopper member disposed within the receiving slot,
        wherein the rotatable member is rotatable relative to the stator over a range of motion defined relative to the stopper member, and wherein the rotatable member is coupled to the at least one leaf member such that rotating the rotatable member in a first direction uncovers the sensing window, and such that counter-rotating the rotatable member in a second direction covers the sensing window with the at least one leaf member.

8. The shutter mechanism in accordance with claim 7, further comprising a first pressurization line configured to channel a first flow of pressurization fluid towards the rotatable member, the first flow configured to rotate the rotatable member in the first direction.

9. The shutter mechanism in accordance with claim 8, further comprising a second pressurization line configured to channel a second flow of pressurization fluid towards the rotatable member, the second flow configured to counter-rotate the rotatable member in the second direction.

10. The shutter mechanism in accordance with claim 9, wherein the second pressurization line is configured to channel a passive flow of pressurization fluid towards the rotatable member, the passive flow configured to rotate the rotatable member in the second direction, and the passive pressurization fluid channeled at a lower pressure than the first flow such that the rotatable member rotates in the first direction when the first flow is channeled towards the rotatable member.

11. The shutter mechanism in accordance with claim 7, further comprising at least one plate coupled to the shutter frame, the at least one plate configured to channel cooling fluid across the at least one leaf member.

12. The shutter mechanism in accordance with claim 11, wherein the at least one plate has a guide slot defined therein, the shutter mechanism further comprising:
a connector coupled between the at least one leaf member and the rotatable member, wherein the connector is translatable within the at least one guide slot to define a range of motion of the at least one leaf member.

13. The shutter mechanism in accordance with claim 7, wherein the at least one leaf member comprises a plurality of leaf members that are nestable with each other when at least one of covering or uncovering the sensing window.

14. The shutter mechanism in accordance with claim 7, wherein the stator further comprises an actuator housing comprising an interior channel, wherein the rotatable member is positionable within the interior channel with a clearance fit.

15. A sensor assembly comprising:
a sensor;
a shutter frame comprising a sensing window;
at least one leaf member configured to selectively cover and uncover the sensing window; and
an actuator comprising:
a rotatable member comprising a receiving slot; and
a stator comprising a stopper member disposed within the receiving slot,
wherein the rotatable member is rotatable relative to the stator over a range of motion defined relative to the stopper member, and
wherein the rotatable member is coupled to the at least one leaf member such that rotating the rotatable member in a first direction uncovers the sensing window, and such that counter-rotating the rotatable member in a second direction covers the sensing window with the at least one leaf member.

16. The sensor assembly in accordance with claim 15, further comprising a first pressurization line configured to channel a first flow of pressurization fluid towards the rotatable member, the first flow configured to rotate the rotatable member in the first direction.

17. The sensor assembly in accordance with claim 16, further comprising a second pressurization line configured to channel a second flow of pressurization fluid towards the rotatable member, the second flow configured to counter-rotate the rotatable member in the second direction.

18. The sensor assembly in accordance with claim 17, wherein the second pressurization line is configured to channel a passive flow of pressurization fluid towards the rotatable member, the passive flow configured to rotate the rotatable member in the second direction, and the passive pressurization fluid channeled at a lower pressure than the first flow such that the rotatable member rotates in the first direction when the first flow is channeled towards the rotatable member.

19. The sensor assembly in accordance with claim 15, wherein the stator further comprises an actuator housing comprising an interior channel, wherein the rotatable member is positionable within the interior channel with a clearance fit.

20. The sensor assembly in accordance with claim 15, wherein the sensor is one of an optical sensor or a capacitance probe.

* * * * *